Jan. 8, 1946.  L. L. SNYDER  2,392,782
AUTOMATIC ANTIBACKFLOW VALVE
Filed Sept. 19, 1942  2 Sheets-Sheet 1

INVENTOR.
LEONARD L. SNYDER
BY James M. Abbott
ATTY.

Jan. 8, 1946.  L. L. SNYDER  2,392,782
AUTOMATIC ANTIBACKFLOW VALVE
Filed Sept. 19, 1942  2 Sheets-Sheet 2

INVENTOR.
LEONARD L. SNYDER
BY James M. Abbott
ATTY.

Patented Jan. 8, 1946

2,392,782

UNITED STATES PATENT OFFICE 2,392,782

AUTOMATIC ANTIBACKFLOW VALVE

Leonard L. Snyder, Montebello, Calif.

Application September 19, 1942, Serial No. 458,930

8 Claims. (Cl. 137—78)

This invention relates to liquid flow systems and particularly pertains to an automatic anti-backflow valve.

In connection with liquid flow systems, such for example as those in which water is delivered from a water main through a connecting service pipe service line or supply line to the domestic lines of a building, or in cases where water is delivered in the same manner to equipment in an industrial plant or to any private or domestic piping system or fixtures or equipment thereon, occasions sometimes arise when the water pressure in the supply line and the water pressure in the domestic piping system becomes unbalanced so that a major pressure occurs in the domestic piping system. Under such conditions a backflow action will be created flowing reversely from the domestic service lines to the supply line, with the result that this water, now considered used as well as polluted, contaminated, or containing deleterious matter, may be drawn into the domestic piping system, through the service line and into the water mains, and thus contaminate the pure water supply. Heretofore, various structures have been produced in an attempt to interrupt the backflow, and thus the back-syphonage of water from the domestic line into the supply line, or to interrupt or prevent back-syphonage from water served fixtures, devices, containers, receptacles or equipment into the domestic piping system, or to interrupt and make impossible reverse flow communcation between dual interconnected supply systems at points of cross-connection where said systems contain water from different sources or where one supply system, often called the secondary, is not under proper sanitary supervision. These have in certain instances proved objectionable due to the fact that a leakage at or through the structure or device of the backflowing water can occur without detection. This might be brought about by the failure of valves to seat, or by the fact that certain parts might become damaged or barrier walls ruptured within the valve structure itself. It is the principal object of the present invention, therefore, to provide automatic means which will act to interrupt the backflow and back-syphonage of water from the domestic lines to the supply line or between water served fixtures, devices, containers, receptacles or equipment and the domestic or supply piping system, or between inter-connected supply systems of different origin, or between any parts or areas of either supply lines or domestic service lines as may be desired, and in addition thereto to create an air chamber which is interposed completely between said desired points therein at a time when either back-syphonage or backflow exists, whereby a reverse flow of water will be interrupted by said air chamber and be expelled to atmosphere, and thus have no opportunity to reach or enter any part or parts of the piping system that said device has been interposed to prevent.

In some instances it has been found that a backflow stream will be established through a check valve that remains wholly or partially open. In connection with check valves, bleeder valves have been provided to drain a portion of the backflowing liquid from the domestic service pipes or from between dual check valves. Some difficulty has been encountered with this type of construction. First, for the reason that under backflow conditions an outlet pressure of a value appreciably above that of the inlet pressure usually exists before the bleeder valve will open and drain the liquid to atmosphere. In cases where a check valve leaks considerable water will backflow into the service main before the bleeder valve is opened, and it is even possible that the outlet pressure never exceeds the inlet pressure by an amount sufficient to open the bleeder valve, yet serious contamination may result through the leaking check valves. Secondly, in some devices employing dual check valves it is found that a check valve may stick. Thus, the valve will be held open and the backflow structure will not function. It has also been found that where a small valve leak occurs within a domestic piping system, this small and continuous stream of liquid will flow across the valve seat and erode or wire-draw the seat to prevent a complete seal.

In the devices previously discussed the opening and closing of the valves has been produced directly by an appreciable change of pressures on the opposite sides of the device. Devices depending on this operating force have not been positive in their action, and it is the principal object in designing this structure to provide an anti-backflow valve which will be simple in its construction and will operate positively and directly in response to a relatively small variation in liquid pressure and with a minimum amount of resistance to the normal flow of liquid through the device when the valves are open.

The present invention contemplates the provision of a valve housing adapted to be disposed directly in the line of flow from a supply line to a domestic piping system, and which structure is fitted with positively actuatted cut-off valves and a positively actuated bleeder valve, the said valves being moved to seated and unseated positions by means responsive to a relatively minute pressure differential on opposite sides of the device.

In this specification the term "supply or service line" indicates any induction connection, and the term "domestic piping system" indicates any eduction connection.

The invention is illustrated by way of example in the accompanying drawings in which.

Figure 1:
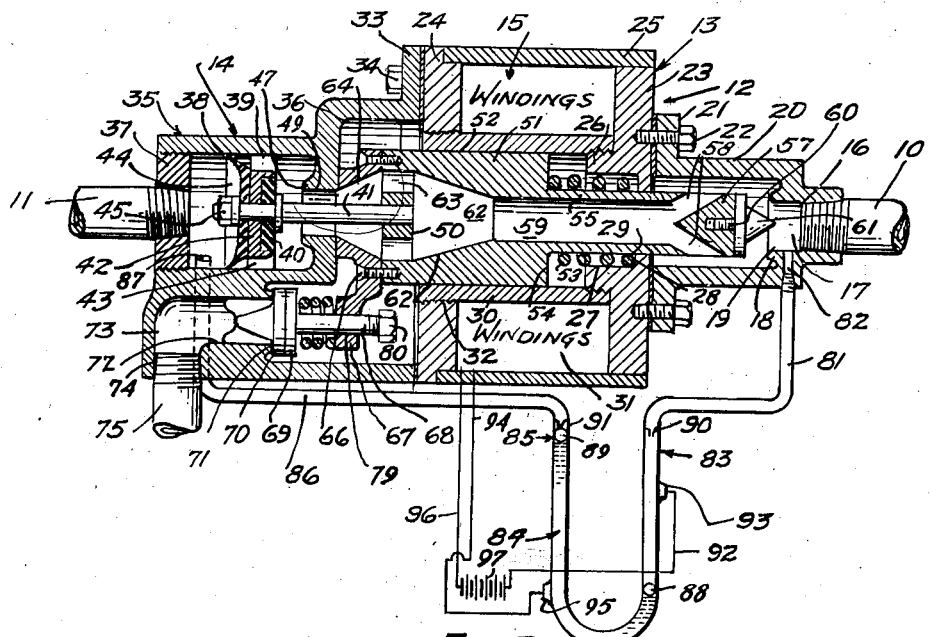
Figure 1 is an enlarged view in central vertical section showing one form of valve unit with which the present invention is concerned with the valve elements in their normally opened positions.

Referring more particularly to the drawings, 10 indicates a pipe connected with a service line. A pipe 11 forms a part of the domestic piping system and is shown in Fig. 1 as being in longitudinal alignment with pipe 10. Interposed between these two pipes is an anti-backflow valve structure 12 with which the present invention is particularly concerned.

The valve structure includes a service valve housing 13, a domestic valve housing 14, and an intermediate solenoid unit 15. The service valve housing 13 is fitted at its outer end with a boss 16 which is formed with a central bore 17. The outer end of this bore is threaded to receive the service pipe 10. Formed around the inner end of the bore 17 is an annular valve seat 18 which is substantially V-shaped in cross-section with a slightly flattened end face 19. Formed integral with the boss 16 and circumscribing the valve seat 18 is a cylindrical portion 20. This is provided with an annular bolting flange 21 receiving cap screws 22 by which the valve housing structure 13 is secured to the solenoid unit 15. The solenoid unit 15 is fitted with opposite end discs 23 and 24 circumscribed by an outer tubular sleeve 25. The cap screws 22 engage threaded openings in the end disc 23 and hold the service valve housing 13 concentrically with relation to the disc. Extending from the opposite face of the disc 23 is a boss 26. This boss is formed with a central bore 27 having a shoulder 28 disposed around an opening 29. The boss 26 is externally threaded and receives a non-magnetic tubular core 30 upon which the winding of a solenoid coil 31 is placed. This core is circumscribed by the sleeve 25. The sleeve 25 overlaps the circumferential edges of the discs 23 and 24 and thus provides a complete housing for the solenoid coil 31 and forming what is known as an ironclad solenoid. The opposite end of the core 30 from the end threaded onto the boss 26 is externally threaded and extends into a threaded opening 32 formed through the disc 24. The threaded connections at each end of core 30 are so constructed as to be fluid-tight, thereby preventing the solenoid coil 31 from coming into contact with the water.

The outlet valve housing 14 is fitted with a bolting flange 33 secured to the end face of the disc 24 by cap screws 34. A central cylinder 35 is formed at the outer end of the valve housing and communicates with an enlarged housing portion 36. Threaded into the outer end of the cylinder 35 is a cylinder plate 37 which is centrally threaded to receive the domestic line 11 connected with a domestic piping system. The cylinder 35 is formed with a central bore 38 within which a piston structure 39 is mounted to reciprocate. The piston structure includes a sealing disc 40 mounted upon a piston rod 41. This disc is held by a cup 42 which is formed with radial fins 43. The fins and the cup are made of metal so that they will act as guides for the piston structure. Mounted on the outer end of the piston rod is a concaved piston cup 44 which is secured in position upon the piston rod 41 by nuts 45. The cup 44 as well as the packing washer 40 are preferably made of non-metallic material, such as rubber for example. The cup has its concaved face presented toward the domestic pipe 11 and when any excess of pressure is exerted by the water in the domestic piping system there is a tendency for the cup to flare outwardly and make a seal with the circumscribing cylindrical wall. One or more small bypass ports 46 are formed through the lip of the cup for a purpose to be hereinafter described.

The sealing disc 40 rests normally against an inwardly projecting annular valve seat 47 formed upon the inner end wall 48 of the cylinder 35. A central bore 49 is formed through the wall and is circumscribed by the valve seat 47. The piston rod 41 is connected to the end spider 50 of a valve plunger 51. The valve plunger 51 is formed with a sliding fit within the tubular core 30 and reciprocates longitudinally therein. The body portion of the plunger is cylindrical, as indicated at 52. It is urged outwardly toward the domestic line 11 by a spring 53 which is interposed between a shoulder 54 on the plunger and the shoulder 28 on the solenoid disc 23.

The spring 53 circumscribes a tubular extension 55 projecting from the end face 54 of the valve plunger 51. This tubular extension projects into the portion 20 of the service valve housing 13 and carries a valve disc 56 which may come to rest against the valve seat 18. The valve disc 56 bears against an end bridge 57 formed at the end of the tubular extension 55. Ducts 58 are formed in the sides of the member 55 and communicate with a central passageway 59 through the valve plunger. The disc 56 is held in position by a cap screw 60 which has a conical head 61 projecting into the bore 17 of the housing 13. The passageway 59 communicates with a passageway 62 of frustoconical shape through which liquid may flow, after which it may pass through flow openings 63 in the spider 50 and then flow into a restricted outlet passageway 64 which is formed in a plate 65 suitably secured to the plunger 52 by screws 66. Extending downwardly from the plate 65 is a lug 67 which receives a bolt 68. The bolt 68 carries a disc 69 adjacent to its outer end and a valve disc 70. The valve disc 70 is the bleeder valve and may rest upon a valve seat 71 formed around an outlet bore 72 of a bleeder valve connection 73. The bleeder valve connection is here shown as being a part of the domestic valve housing 14 and is provided with a threaded outlet 74 to receive a bleeder pipe 75. Guide fins 76 are carried at the outer end of the bleeder valve and slide in the bore 72 which is a continuation of the passageway 73. By this arrangement it is insured that the bleeder valve disc 70 will seat accurately against the valve seat 71. Interposed between the disc 69 of the bleeder valve and the lug 67 is a spring 78 which yieldably holds the valve disc 70 onto its seat 71. Sufficient clearance is provided so that the bolts 68 may slide through an opening 79 in the lug 67. This allows relative movement between the lug 67 and the valve. A nut 80 is provided for the bolt so that when the plunger 51 moves in a counter direction the bleeder valve will be drawn away from its seat.

The solenoid unit 15 is intended to be energized by fluid pressure responsive means. This includes a bypass tube 81 which connects with a duct 82 leading through the wall of the boss 16 and communicating with the bore 17. Thus, water from the service line may flow into the tube 81. The tube 81 is connected to leg 83 of a U-tube 84. A leg 85 of the U-tube connects with a tube 86 which is in communication with the bore 38 of cylinder 35 through a duct 87. The U-tube 84 is partially filled with mercury, and floating upon the mercury in leg 83 of the U-tube is a ball 88. Disposed on the mercury in leg 85 of the U-tube is a ball 89. These balls are preferably made of rubber and will float on the mercury as its level changes in response to variation in pressure in pipes 10 and 11. Mounted at the upper end of the leg 83 is a valve opening and seat 90 which may be encountered by the ball 88. Mounted in the upper leg 85 of the U-tube is a valve and seat 91 which may be encountered by the ball 89. Thus, when the balls 88 and 89 move to extreme positions they will encounter their respective valve seats and limit further movement of the mercury in the U-tube.

Since mercury is a conductor of electricity, it is used in this case to make and break an electric circuit. This is done by providing a connection 92 to an electrode 93 extending through the wall of the U-tube leg 83 and a conductor 94 connected to an electrode 95 extending through the wall of the leg 85 of the U-tube. The conductor 92 leads to one pole of the solenoid coil 31. The conductor 94 connects with an electric feed wire 96. The conductor 96 connects to one pole of a source of electrical energy 97. The other pole connects to conductor 92. The horizontal level of the electrodes 93 and 95 are so disposed as to insure that when the level of the column of mercury of the leg 83 of the U-tube is lowered from a point of contact with the electrode 93 the electric circuit through the solenoid coil will be broken, and when the level of the mercury contacts this electrode the solenoid circuit will be closed to cause the solenoid coil to be energized, for a purpose to be hereinafter described.

Figure 2:
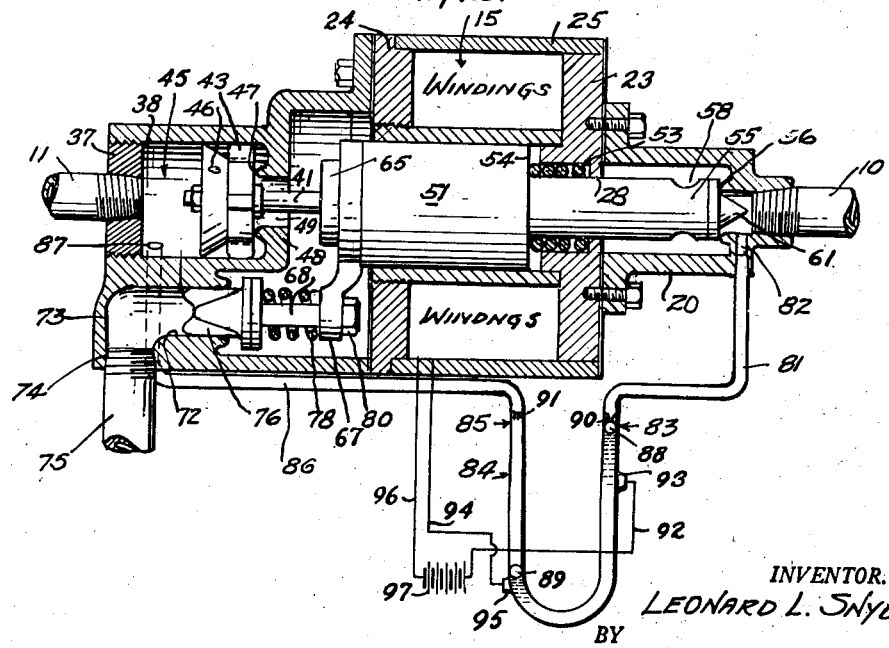
Fig. 2 is an enlarged view in central vertical section showing one form of valve unit with which the present invention is concerned with the valve elements in the position assumed when a condition of backflow takes place.
Figure 3:
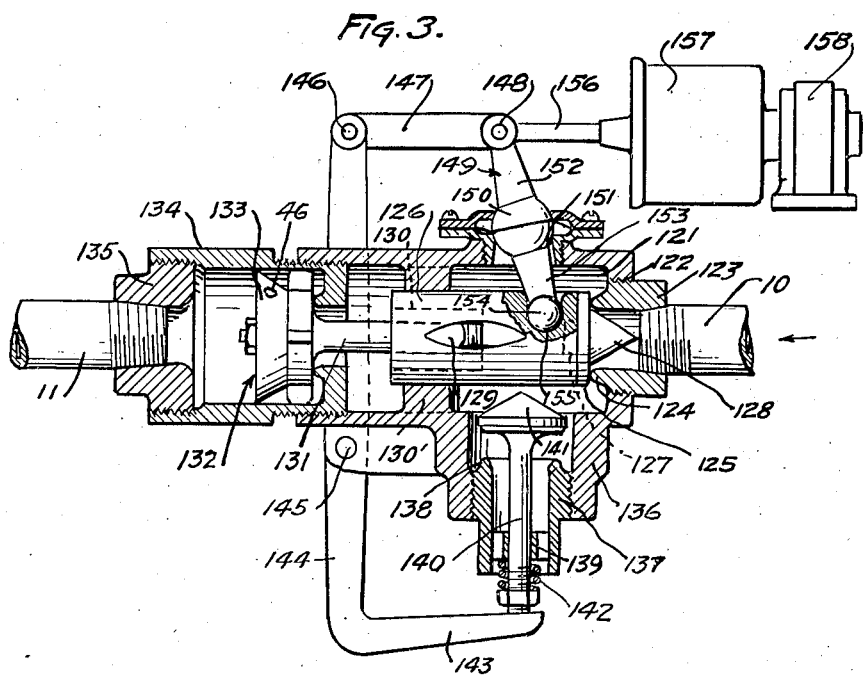
Fig. 3 is an enlarged view in central vertical section showing a modified form of valve arrangement operated by positive mechanical means.

In the form of the invention shown in Figs. 1 and 2 the difference of level of columns of mercury in a U-tube make and break an electric circuit.

Referring particularly to Fig. 4 of the drawings, a valve structure is shown which is similar to that shown in Figs. 1 and 2 save for the fact that the solenoid is eliminated and other operating means is provided. In this structure a housing cylinder 121 is provided. A threaded bore 122 is formed in one end of the cylinder and receives a nipple 123. The nipple 123 is internally threaded to receive the service pipe 10. A valve seat 124 is formed around the inner end of the threaded bore for the pipe 10. Adapted to seat against the valve seat 124 is a valve disc 125 carried by a plunger 126. The valve disc is secured in position by a cap screw 127 having a conical head 128 which extends into the bore of the nipple. Passageways 129 are formed in the sides of the plunger 126 and communicate with longitudinally extending passageways 130 through which liquid may flow. The passageways 130 are provided between the internal spaced lugs 130' formed on the inner bore of the cylinder 121. Secured to the forward end of the plunger 126 is a valve stem 131 carrying a valve unit 132. This unit is of the type previously described as used in the structure disclosed in Figs. 1 and 2 and includes a cup 133 which reciprocates within a cylinder 134. The cylinder 134 is threaded into the end of the cylinder 121 and is provided with a nipple 135 which is internally threaded to receive the domestic pipe 11. A tubular extension 136 is formed integral with the cylinder 121 and is disposed with its axis at right angles to the longitudinal axis of the cylinder 121. It is preferable that this extension be disposed with its axis vertical and below the longitudinal axis of the cylinder. A threaded nipple 137 is screwed into this extension and carries a valve seat 138. Extending through the nipple and guided by a bearing 139 is a valve stem 140 which carries a valve element 141. This element is designed to seat upon the valve seat 138 and when lifted will act to bleed the valve chamber in the event there is any leakage of water around the valve 132 or valve seat 124. A spring 142 acts to normally hold the valve 141 on its seat. A finger 143 rests against the end of the valve stem 140 and acts in opposition to the spring to lift the valve. This finger is carried by a lever 144 pivoted to the housing structure 121 upon a pin 145. The free end of the lever is provided with a pivot 146 which is secured to a shackle link 147. The opposite end of the link is engaged by a pivot pin 148 which secures it to a shift lever 149. The shifting lever 149 is formed with a ball 150 mounted within a seat 151. The lever has a lever arm 152 which is pivotally engaged by the pivot pin 148 on one side of the ball and a lever 153 which is disposed on the opposite side of the ball. At the free end of the lever 153 is a ball 154 mounted within a socket 155 which is formed in the upper side of the valve plunger 126. A flexible packing disc is associated with the ball 150 to prevent a leakage of fluid from the cylinder 121. Connected to the lever 152 and the shackle 147 by a pivot pin 148 is a piston rod 156. This is connected with a suitable piston mounted within the cylinder of an electric motor driven thrustor. This device is generally indicated at 157, although the details of construction are not shown since it is a commercial device obtainable upon the market. An electric motor 158 drives this structure and is supplied with electricity through suitable conductors.

In operation of the form of the invention shown in Figs. 1 and 2 the valve structure 12 is interposed between the service pipe 10 and the domestic pipe 11, and when this structure is in open position, as shown in Fig. 1, the water from the pipe 10 may pass through the bore 17 in the housing 13, and then around the end of the valve disc 56, after which it will flow through the ports 58 and into the passageways 59 and 62, which lead through the valve plunger 51, and thence through the openings 63 to the chamber formed in the housing portion 36. The water then flows through the bore 49 in the domestic valve housing 14 and then around the cup 44 which is carried as a part of the piston valve structure 39. Due to the flexibility of the marginal edge of the cup 44 the water will be free to pass around the cup 44 and through the bore of the cylinder 38 to the domestic line 11. The spring 53 will maintain the plunger 51 in its moved position, as shown in Fig. 1, and thus make it possible for a flow of water to take place in a direction from the service line 10 to the domestic line 11. It will also be evident that so long as there is a continuous normal flow of liquid from the pipe 10 to the pipe 11 there would be a tendency for the valves to remain open even though the spring became inoperative. Attention is directed to the fact that when the plunger 51 is in its extreme position, as shown in Fig. 1 of the drawings, the end face of the member 64 will rest against the face of the cylinder end 48 and will limit the amount of movement of the piston valve 39 toward the head 37 of its cylinder. At the same time that this movement takes place the lug 67 will be moved toward the valve seat 71 and will force the bleeder valve disc 70 onto the seat 71. In view of the fact that the normal space between the disc 69 and the lug 67 is greater than the length of travel of the lug, the spring 78 will act to compress and hold the valve disc 70 onto its seat 71 with considerable force.

The operation of the mechanical structure, as previously described, will function when the pressure of water in the pipes 10 and 11 is equal or when the pressure of water in pipe 10 is greater than the pressure in pipe 11, and also of course when the flow of water through the structure is in the direction from the service line 10 to the domestic line 11.

Attention is directed particularly to the action of the piston 39 and its cup 44. It will be seen that the cup is concaved on the eduction side of the housing, and that its edge is relatively thin. Attention is also directed to the fact that by-pass ports 46 are formed through it. Thus the flared lip of the cup may be easily flexed to permit the flow of water from the housing to the eduction side and will be forced outwardly with a relatively small fluid pressure to engage the wall when backflow occurs. The cup is not sufficiently rigid to create a fluid seal against excessive backflow pressure. Its purpose is to create sufficient backflow pressure through the tube 86 to insure actuation of the fluid pressure responsive means 84.

The present invention is concerned additionally with positive and direct means for preventing backflow of the water from the domestic line 11 into the service line 10, which condition would occur at any time when the water pressure in the service line 10 is of lesser value than the pressure in the domestic line 11. This action is concerned with the U-tube 84. As previously stated, the mercury in the U-tube 84 stands at a common level in the legs 83 and 85 of the tube under static condition. Under normal flow conditions the level will be established by the amount of pressure differential between the fluid in pipes 10 and 11 and the level will be higher in leg 85 than in leg 83. On backflow this condition will be reversed. In some instances it might be desirable to arrange the valve to cause it to operate when the pressure in pipe 11 is below the pressure in pipe 10. This can be done by lowering the contact position of electrode 92. By this arrangement additional safety can be insured when a backflow condition is extremely hazardous. The electrode 95 is in continuous contact with the mercury in the U-tube 84 and the electrode 93 is normally out of contact with the mercury in the leg 83 of the U-tube so that the circuit to the solenoid coil 31 is broken normally. In the event, however, that the pressure of liquid in the tubes 81 and 86 becomes unbalanced so that the pressure in the tube 86 is superior, it will be seen that the liquid in tube 86 will pass downwardly through the valve seat 91 and will lower the level of mercury within leg 85 of the U-tube and raise it in leg 83. It will be recognized that the amount of change in level can be very slight so that a minute difference in pressure will bring the mercury in leg 83 into contact with the electrode 93 and close the circuit through conductors 92 and 94 to energize the coil 31. This will act to retract the plunger 51 and move the valve elements 40 and 56 onto the valve seats 47 and 18, respectively. Thus, the flow of water will be positively interrupted at two points so that the water cannot backflow from the domestic pipe 11 and into the housing section 36 and into or through the passageways formed through the plunger 51. Simultaneously with this operation the lug 67 carried by the plunger 51 will be retracted to a position where it will positively engage the nut 80 and pull the valve disc 70 off its seat 71. This will permit any liquid which had been entrapped in the housing section 36 to drain or bleed from the housing through the passageway 72 into the bleeder pipe 75. It will also be recognized that should there be any leakage around the valve 39 and over the valve seat 47 this will drain off through the bleeder pipe 75 and will have no opportunity to reach the passageway through the plunger 51. Attention is directed to the fact that when the plunger 51 moves away from the end face of the cylinder head 48 there is provided a gap so that leakage water would spill over the edge of the bore 49 and pass downwardly to drain from the housing through the bleeder pipe 75.

In the event that excessive differential pressure exists in either direction between the pipes 10 and 11 it will be recognized that the balls 88 and 89 in the U-tube 84 will move in response to the pressure until a ball seats forcefully against its complementary seat 90 or 91. This will prevent the loss of mercury in the tubes 81 or 86.

When the proper balance of pressure has been re-established between the liquid in the service pipe 10 and the liquid in the domestic pipe 11 the mercury in the legs 83 and 85 of the U-tube 84 will be restored to their normal position. This will interrupt the flow of electric current to the coil 31 and will permit the spring 53 to expand. This action will simultaneously move the valve discs 40 and 56 from their seats so that a normal flow of liquid through the control unit will occur.

In the form of the invention shown in Fig. 4 the structure operates on the same principle shown in Figs. 1 and 2. When the electric circuit to the motor 158 is completed the motor drives the thrustor 157, forcing the rod 156 toward the left as viewed in Figure 4, actuating the lever 149 to force the valves 125 and 132 onto their corresponding seats. This action will also swing the lever 144 to lift the bleeder valve 141.

Attention is directed to the fact that the piston cups 44 and 133 are both formed with a relatively small bypass duct 46. This port permits equalization of pressure around the cups after valve 39 has seated, and by making the openings through the valve seats 18 and 47 substantially equal in area, the valve will act as a balanced valve, and a very small excess in pressure in service pipe 10 will cause the plunger to move to a normal flow position. If these holes were not present, under a backflow condition the opening of the bleeder valve might cause the pressure back of the cups to drop to zero. Since the area of the cylinder 38, which is sealed by the cups 44 and 133, is much larger than the area through valve seats 18 and 124, excessive pressure would have to be built up in the service pipe 10 before normal flow would resume.

Attention is also directed to the fact that in operation of the U-tube structure the openings through seats 90 and 91 are small so that rapid fluctuation in pressure, such as might be caused by water-hammer, will not operate to close the valve, but a steady rise in outlet pressure above inlet pressure, although of only a few seconds duration, would close the switch and operate the valve.

It will thus be seen that the backflow prevention valve units here disclosed are simple and rugged in construction and provide for a direct stream flow of liquid from the service line to the domestic line with rapid positively acting means for closing valves to prevent backflow, thus insuring that the valve will operate with great precision and with a minimum friction loss due to the flow of water through the structure.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In combination with an inflow pipe and an outflow pipe disposed in substantial longitudinal alignment, a backflow prevention valve housing therebetween and with which the contiguous ends of said pipes communicate, an inflow valve seat, an outflow valve seat within said housing and in substantial longitudinal alignment with each other and the pipes, a valve for each of said seats, means connecting said valves so that they will move in unison toward and away from their seats, means acting to thus move said valves, and fluid responsive means communicating with the inlet and outlet pipes at points beyond their seats and, whereby a differential pressure between the fluid in the inlet and outlet pipes will initiate movement of said valve operating means tending to move both of said valves to a seated position when the inflow fluid pressure is less than the outflow fluid pressure.

2. The structure of claim 1 including an outlet opening in said housing to the atmosphere between the inflow and outflow opening, a valve for said outlet opening, and connecting means between the latter said valve and the two first-mentioned valves arranged so that when the first-mentioned valves are opened the latter mentioned valve will be closed and so that when the first-mentioned valves are closed the latter-mentioned valve will be open.

3. In combination with a service pipe and a domestic pipe disposed in substantially longitudinal alignment, a backflow prevention valve housing interposed therebetween and connected therewith and through which housing fluid may flow from the service line to the domestic line, a service valve seat within the housing adjacent to the service line, a domestic valve seat within the housing adjacent to the domestic line, a service valve adapted to rest upon the service valve seat, a domestic valve adapted to rest upon the domestic valve seat, means rigidly connecting said valves together so that they may move simultaneously toward and away from their seats and so that when said valves are in their open position a continuous flow of fluid may take place between the service and domestic pipes, and the said valves opening in the direction of flow from the service line to the dometic line when the fluid pressure in the service line is greater than in the domestic line, a bleeder valve opening in the housing communicating with the space between the above mentioned seats and communicating with the atmosphere, a bleeder valve for opening and closing said bleeder valve opening, a connection between the bleeder valve and the service and domestic valves and spacing the same so that the bleeder valve will be opened when the service and domestic valves are closed and closed when the service and domestic valves are open, means yieldably holding the service and domestic valves off of their seats under normal fluid flow conditions, means positively actuating the service and domestic valves to move them onto their seats and to hold them seated, and fluid pressure means responsive to a predetermined differential in fluid pressure within the two lines to initiate and interrupt the operation of the valve moving means and whereby the relief valve is moved to open position when the fluid pressure in the domestic line approaches the fluid pressure within the service line within the pressure differential.

4. An anti-backflow valve including a housing having inlet and outlet fluid conduits and an inlet and an outlet port, a flow chamber therethrough, a movable plunger in said housing carrying inlet and outlet valves, a solenoid for moving the same, a differential manometer responsive to pressures in the supply and domestic conduits at points beyond said inlet and outlet ports, an electrical circuit including said solenoid operably connected through the liquid in said manometer so that a fluid pressure in the domestic conduit in excess of the fluid pressure in the supply conduit will close the electrical circuit and energize the solenoid to move the valves to a closed position.

5. The structure of claim 4 including a relief valve located in the flow chamber between the inlet and outlet ports and operably connected to move with the plunger, said relief valve to be urged toward a closed position when the plunger has moved to open the inlet and outlet ports, and means connecting the relief valve with the plunger so that the relief valve is opened when the plunger is moved to position to close the inlet and outlet ports.

6. In combination with an induction and an eduction pipe, a housing connecting the same formed with a chamber through which fluid may flow, a dual valve structure in said housing for interrupting the flow of fluid between the pipes, the dual valve structure including spaced valve members connected together so that they will move in unison, separate valve seats adjacent the opposite ends of said housing and toward and away from which said dual valve structure moves in unison, a fluid outlet from the housing between the valve seats, a relief valve normally closing said outlet when the valves of the dual valve structure are in an open position and moving with the dual valve structure to an open position when the dual valves are closed, fluid pressure responsive means, conduits connecting the induction pipe with the fluid pressure responsive means and connecting the eduction line with the fluid pressure responsive means in opposition to the connection therewith by the first said conduit whereby the induction and eduction fluid pressures are opposed in the fluid pressure responsive means, means for moving the dual valves, and means associated with the fluid pressure responsive means to initiate movement of the said dual valve operating means and acting when the pressure in the eduction line approaches the pressure within the induction line within a predetermined pressure differential such that fluid would otherwise flow from the eduction line to the induction line.

7. In combination with an induction pipe and an eduction pipe, a housing connected with the same and forming a chamber through which fluid flows from one pipe to the other, a valve structure in said housing for interrupting the flow of fluid between the pipes, a cylinder at one end of said valve structure and with which the eduction pipe connects, a flared flexible cup carried by the valve structure and bearing against the wall of the cylinder, the cavity of said cup facing the eduction connection, and acting under fluid pressure against the cavity to distend the facing outwardly against the cylinder wall to form an effective fluid seal with the cylinder, opposed fluid responsive means, one side of which connects with the induction pipe and the other side of which connects with the eduction pipe beyond said cup whereby the cup will form a fluid seal with the cylinder and permit fluid pressure to be built up on the eduction side of the fluid responsive means, and means actuated by said fluid responsive means to move the valve structure to flow-interrupting position when the inflow pressure is less than the outflow pressure.

8. The combination as defined in claim 7 wherein there is formed a relatively small by-pass opening through the cup.

LEONARD L. SNYDER.